(12) United States Patent
Bao

(10) Patent No.: US 11,988,359 B2
(45) Date of Patent: May 21, 2024

(54) INTEGRATED SOLAR STREET LAMP

(71) Applicant: Guandong Bao, Jiujiang (CN)

(72) Inventor: Guandong Bao, Jiujiang (CN)

( * ) Notice: Subject to any disclaimer, the term of this patent is extended or adjusted under 35 U.S.C. 154(b) by 0 days.

(21) Appl. No.: 18/357,099

(22) Filed: Jul. 22, 2023

(65) Prior Publication Data
US 2023/0358378 A1    Nov. 9, 2023

(30) Foreign Application Priority Data

Apr. 26, 2023   (CN) .......................... 202320965350.6

(51) Int. Cl.
| | |
|---|---|
| *F21S 8/08* | (2006.01) |
| *F21S 9/03* | (2006.01) |
| *F21Y 105/00* | (2016.01) |
| *F21Y 115/10* | (2016.01) |

(52) U.S. Cl.
CPC ............... *F21S 8/085* (2013.01); *F21S 9/037* (2013.01); *F21Y 2105/00* (2013.01); *F21Y 2115/10* (2016.08)

(58) Field of Classification Search
CPC .... F21S 9/037; F21Y 2105/00; F21Y 2115/10
See application file for complete search history.

(56) References Cited

U.S. PATENT DOCUMENTS

| | | | | |
|---|---|---|---|---|
| 9,466,211 | B1* | 10/2016 | Gesmundo | .......... F21V 21/0816 |
| 2009/0303703 | A1 | 12/2009 | Kao et al. | |
| 2010/0126549 | A1* | 5/2010 | Ryu | ...................... F21V 33/006 |
| | | | | 136/244 |
| 2010/0302763 | A1* | 12/2010 | Chu | ........................ F21S 6/002 |
| | | | | 362/183 |
| 2010/0302764 | A1* | 12/2010 | Yu | .......................... F21V 29/83 |
| | | | | 362/183 |
| 2011/0222284 | A1 | 9/2011 | Kong et al. | |
| 2012/0262911 | A1* | 10/2012 | Schweizer | .............. F21S 9/037 |
| | | | | 362/183 |
| 2012/0275155 | A1 | 11/2012 | Kong et al. | |
| 2016/0025287 | A1* | 1/2016 | Philhower | ............... F21S 8/022 |
| | | | | 362/183 |

* cited by examiner

*Primary Examiner* — Evan P Dzierzynski
(74) *Attorney, Agent, or Firm* — Zhigang Ma

(57) ABSTRACT

The present disclosure relates to the technical field of solar street lamps, in particular to, an integrated solar street lamp. The present disclosure provides an integrated solar street lamp, including an integrated light emitting panel and a transparent cover body; the integrated light emitting panel is hermetically arranged in the transparent cover body; the integrated light emitting panel includes a first conducting plate including two separated plate bodies, a second conducting plate including two separated plate bodies, and a plurality of monocrystal silicon thin slabs coplanar with the first conducting plate; the plurality of monocrystal silicon thin slabs are connected in series through conductors; and two ends of the conductors are electrically connected to the two plate bodies of the first conducting plate respectively.

7 Claims, 4 Drawing Sheets

INTEGRATED SOLAR STREET LAMP

TECHNICAL FIELD

The present disclosure relates to the technical field of solar street lamps, in particular to, an integrated solar street lamp.

BACKGROUND

A solar street lamp in the prior art mainly includes a solar panel body and a lamp body which are separately mounted on the lamp post. The lamp body includes commonly-used outdoor lamp structures such as a waterproof lamp housing, internal LEDs, and a reflector cover. The solar panel body cooperates with a storage battery and a control power supply to supply power. The overall structural components are inconvenient to mount and fix outdoors, and the overall production cost is high.

SUMMARY

Technical Problems to be Solved

For the above defects in the prior art, the present disclosure provides an integrated solar street lamp, which can effectively solve the following problems: The solar street lamp in the prior art mainly includes a solar panel body and a lamp body, so that the overall structural components are inconvenient to mount and fix outdoors, and the overall production cost is high.

Technical Solution

In order to achieve the above objective, the present disclosure is implemented through the following technical solution:

The present disclosure provides an integrated solar street lamp, including an integrated light emitting panel and a transparent cover body. The integrated light emitting panel is hermetically arranged in the transparent cover body. The integrated light emitting panel includes:
- a first conducting plate, including two separated plate bodies;
- a second conducting plate, including two separated plate bodies;
- a plurality of monocrystal silicon thin slabs, coplanar with the first conducting plate, wherein the plurality of monocrystal silicon thin slabs are connected in series through conductors; two ends of the conductors are electrically connected to the two plate bodies of the first conducting plate respectively; and
- a plurality of light emitting diodes (LEDs), distributed in clearances between the monocrystal silicon thin slabs, wherein electric pins of the LEDs are electrically connected to the two plate bodies of the second conducting plate respectively.

Further, the transparent cover body includes an upper board body and a lower board body distributed in parallel; the integrated light emitting panel is arranged between inner sides of the upper board body and the lower board body; and outer rings of the inner sides of the upper board body and the lower board body are filled with sealants.

Further, both the first conducting plate and the second conducting plate are copper foil plates, and a plurality of through holes are formed in positions of the conducting plates close to end portions; and the sealants fill the through holes.

Further, the upper board body and the lower board body use high-transmittance tempered glass.

Further, there are two layers of monocrystal silicon thin slabs symmetrically distributed; each layer of monocrystal silicon thin slabs are in matrix distribution; and the plurality of monocrystal silicon thin slabs are connected in series between the two plate bodies of the first conducting plate through nickel straps.

Further, the LEDs are distributed around outer sides of the monocrystal silicon thin slabs by using the clearances formed between the monocrystal silicon thin slabs.

Further, a plurality of tinned strips are distributed on the second conducting plate in a same direction at intervals.

Beneficial Effects

Compared with the prior art, the technical solutions provided by the present disclosure has the following beneficial effects:

According to this product, a lamp body and a solar battery panel body are integrated. The thin first conducting plate and second conducting plate are used as main conductors of the integrated light emitting panel, and the plurality of monocrystal silicon thin slabs are used as power supplies. According to the design, the plurality of LEDs are arranged in the clearances between the monocrystal silicon thin slabs. Due to the mirror effect of the monocrystal silicon thin slabs, a good light emitting main body is formed. The light and thin integrated light emitting panel integrates power generation and light emission, and is hermetically arranged in the transparent cover body to form a whole. During outdoor mounting and construction, the whole device is convenient to fix and operate and has high working efficiency. Meanwhile, compared with the street lamp in the prior art, this product is not provided with a lamp housing, a lampshade, a reflector cover, and other lamp components, so that the overall production cost of a street lamp is effectively reduced.

BRIEF DESCRIPTION OF THE DRAWINGS

In order to describe the technical solutions in the embodiments of the present disclosure or in the prior art more clearly, drawings used in the description of the embodiments or the prior art are briefly described below. Apparently, the drawings in the following description are only some embodiments of the present disclosure. Those of ordinary skill in the art can further obtain other drawings based on these drawings without creative work.

Figure 1:
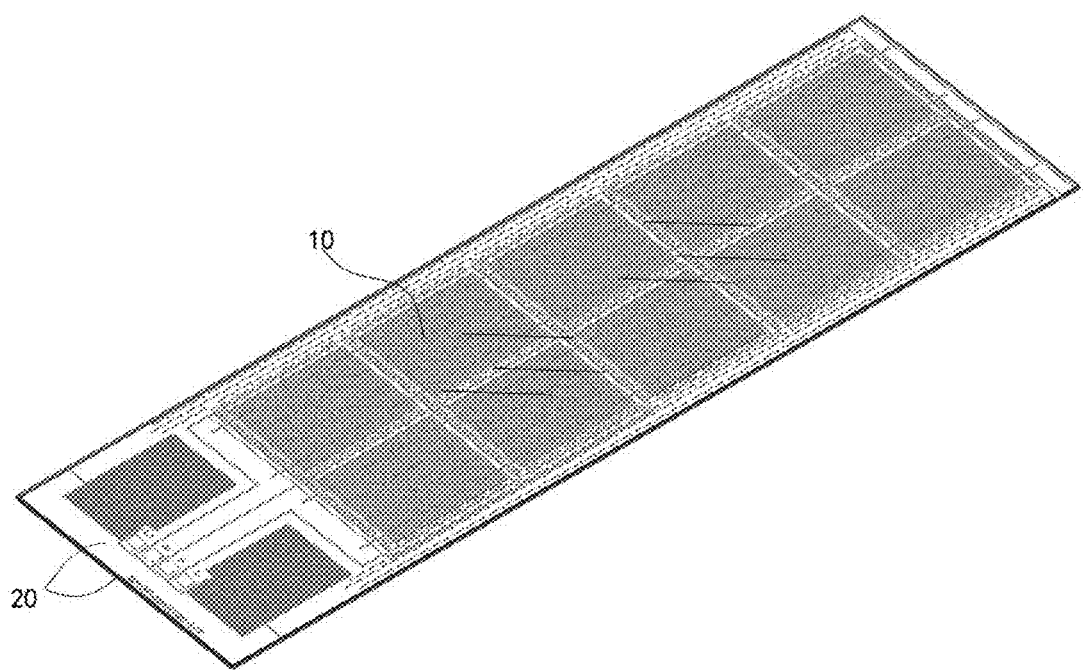
FIG. 1 is a perspective diagram of an overall structure of the present disclosure.

Numerals in the drawings: 10: integrated light emitting panel; 20: transparent cover body; 21: upper board body; 22: lower board body; 30: first conducting plate; 40: second conducting plate; 41: tinned strip; 50: monocrystal silicon thin slab; 60: LED; 70: conductor; 80: through hole; and 90: nickel strap.

DETAILED DESCRIPTION OF THE EMBODIMENTS

In order to make the objectives, technical solutions and advantages of the embodiments of the present disclosure clearer, the technical solutions in the embodiments of the present disclosure are described clearly and completely below in conjunction with the drawings in the embodiments of the present disclosure. Obviously, the described embodiments are a part of the embodiments of the present disclosure, not all the embodiments. Based on the embodiments in the present disclosure, all other embodiments obtained by those of ordinary skill in the art without creative work shall fall within the protection scope of the present disclosure.

The present disclosure is further described below in combination of embodiments.

Embodiments

Figure 2:
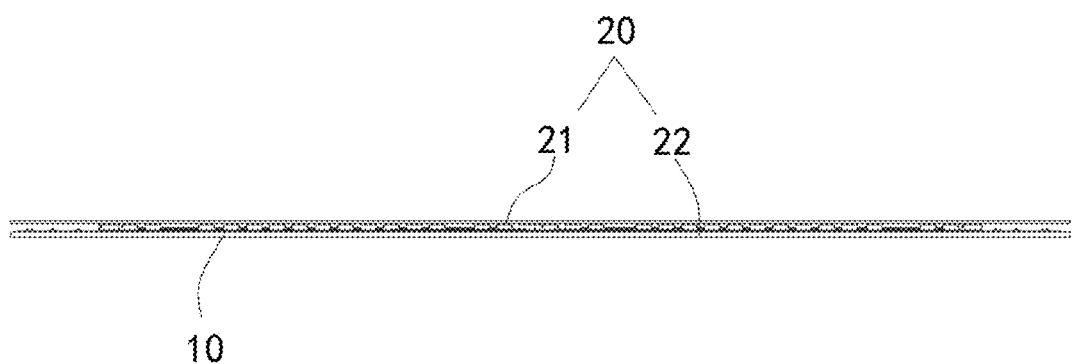
FIG. 2 is a side view of an overall structure of the present disclosure.
Figure 3:
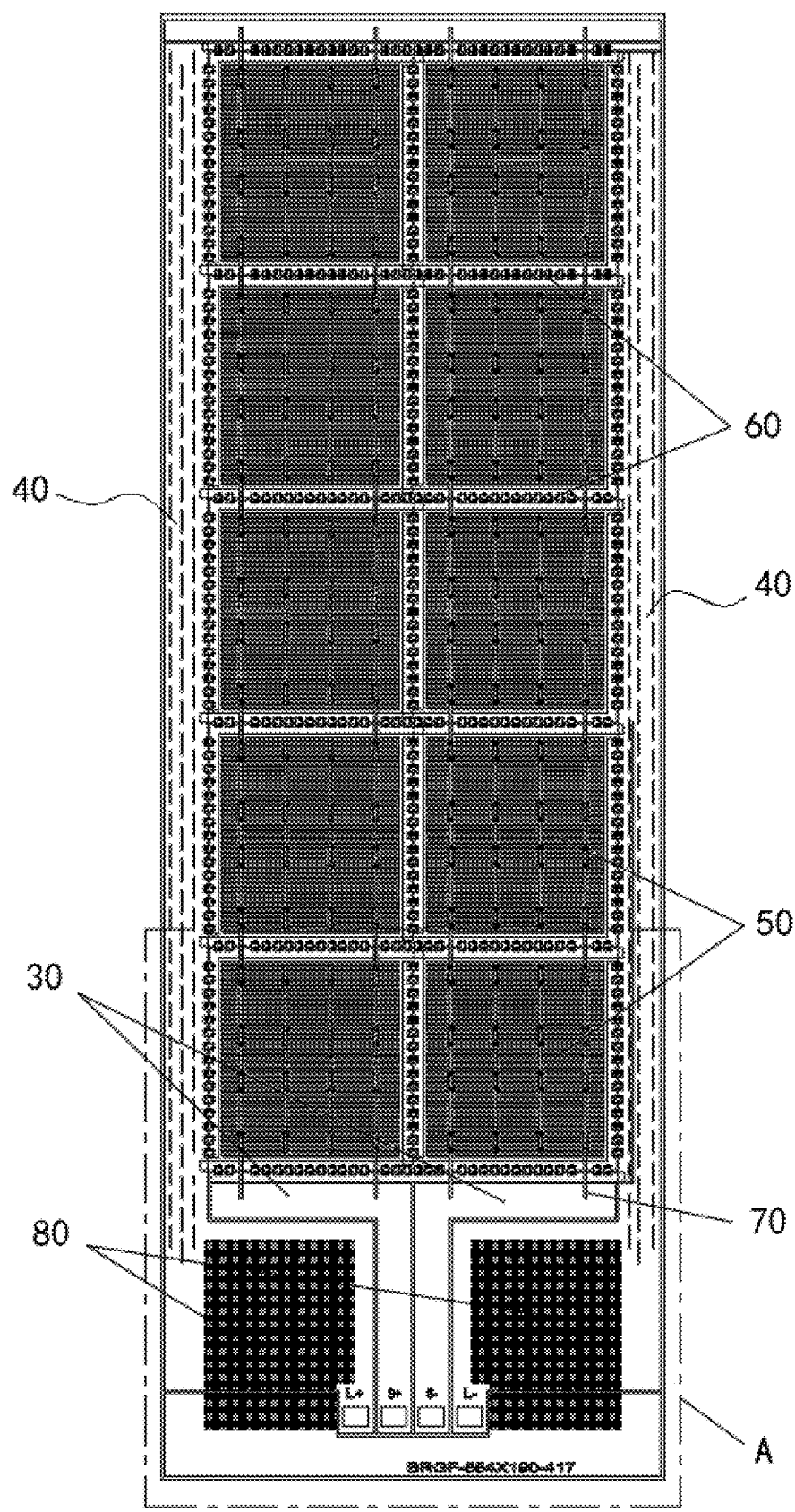
FIG. 3 is a front view of an integrated light emitting panel of the present disclosure.
Figure 4:
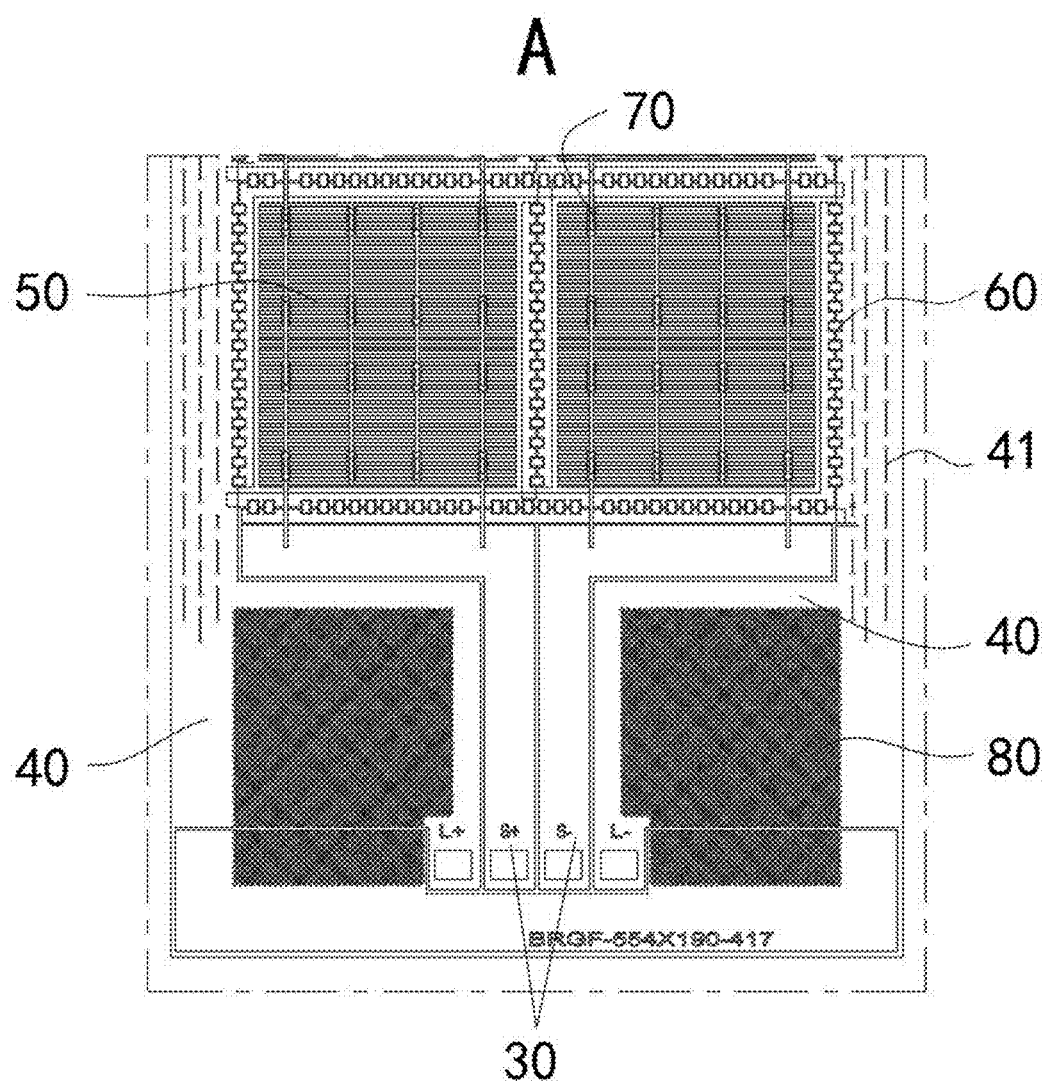
FIG. 4 is a partially enlarged diagram of a portion A in FIG. 3 of the present disclosure.

The present disclosure provides an integrated solar street lamp, which is improved by integrating a split lamp body and solar battery panel body in the prior art. Referring to FIG. 1 to FIG. 4, the improved product is a rectangular platy main body with a transparent housing, and includes main structures: an integrated light emitting panel 10 and a transparent cover body 20. The integrated light emitting panel 10 is hermetically arranged in the transparent cover body 20. In this embodiment, preferably, the transparent cover body 20 includes an upper board body 21 and a lower board body 22 distributed in parallel. The integrated light emitting panel 10 is arranged between inner sides of the upper board body 21 and the lower board body 22. Outer rings of the inner sides of the upper board body 21 and the lower board body 22 are filled with sealants, so as to ensure outdoor waterproof and dustproof effects of a street lamp main body. During use, the integrated light emitting panel 10 needs to be connected to a storage battery and a control power supply by using an external lead wire, which will not be repeated here.

As a structural core of this product, the integrated light emitting panel 10 mainly includes a first conducting plate 30, a second conducting plate 40, monocrystal silicon thin slabs 50, and LEDs 60. The first conducting plate 30 includes two separated plate bodies. The two plate bodies of the first conducting plate 30 are used for being connected to the monocrystal silicon thin slabs 50. During use, the two plate bodies are separately used as a positive plate and a negative plate connected to the control power supply. Electric energy converted by the monocrystal silicon thin slabs 50 is stored in the storage battery. Specifically, the plurality of monocrystal silicon thin slabs 50 are coplanar with the first conducting plate 30. The plurality of monocrystal silicon thin slabs 50 are connected in series through conductors 70. Two ends of the conductors 70 are electrically connected to the two plate bodies of the first conducting plate 30 respectively.

In addition, the second conducting plate 40 located on an inner side of the first conducting sheet 30 also includes two separated plate bodies. Of course, the first conducting plate 30 and the second conducting plate 40 are also spaced apart. The two plate bodies of the second conducting plate 40 are used as positive and negative power supply conductors for the LEDs 60, and are connected to the storage battery outside to supply an on-current to the LEDs 60, so that the LEDs 60 emit light to realize a street lamp function. Specifically, the plurality of LEDs 60 are distributed in clearances of the monocrystal silicon thin slabs 50. Electric pins of the LEDs 60 are electrically connected to the two plate bodies of the second conducting plate 40 respectively.

According to this product, the thin first conducting plate 30 and second conducting plate 40 are used as main conductors of the integrated light emitting panel 10, and the plurality of monocrystal silicon thin slabs 50 are used as power supplies. According to the design, the plurality of LEDs 60 are arranged in the clearances between the monocrystal silicon thin slabs 50. Due to the mirror effect of the monocrystal silicon thin slabs 50, a good light emitting main body is formed. The light and thin integrated light emitting panel 10 integrates power generation and light emission, and is hermetically arranged in the transparent cover body 20 to form a whole. During outdoor mounting and construction, the whole device is convenient to fix and operate and has high working efficiency. Meanwhile, compared with the street lamp in the prior art, this product is not provided with a lamp housing, a lampshade, a reflector cover, and other lamp components, so that the overall production cost of a street lamp is effectively reduced.

In addition, in this embodiment, preferably, the first conducting plate 30 and the second conducting plate 40 are copper foil plates, a base body of which is thin and highly conductive. A plurality of through holes 80 are formed in positions of the first conducting plate 30 and the second conducting plate 40 close to end portions, and the sealants fill the through holes 80. Due to the arrangement of the through holes 80, the stability of fixing between the first conducting plate 30 and the second conducting plate 40 is improved. The sealants fill the through holes 80 to bond the first conducting plate 30 and the second conducting plate 40 into a whole between the upper board body 21 and the lower board body 22. The upper board body 21 and the lower board body 22 of this product use high-transmittance tempered glass, which ensures good penetrativity of light and achieves excellent protection performance.

In this embodiment, preferably, it is designed that there are two layers of monocrystal silicon thin slabs 50 symmetrically distributed. Each layer of monocrystal silicon thin slabs 50 are in matrix distribution. Of course, illuminated faces of each layer face the upper board body 21 or the lower board body 22 respectively. Due to the design of the two layers of monocrystal silicon thin slabs 50, on the one hand, the photoelectric conversion capability of the lamp main body for solar energy is further improved. Meanwhile, the monocrystal silicon thin slabs 50 facing the lower board body 22 can be used as "reflector covers" of the LEDs 60 due to their "mirror" effect, which well improves the lighting effect of the lamp. In addition, in this embodiment, a monocrystal silicon thin slab of 300 nm to 1000 nm is preferably used. Since light has a wavelength of 500 nm to 600 nm, the monocrystal silicon thin slabs 50 can be charged by visible light. Light emitted at night by the LEDs 60 located on one side of the monocrystal silicon thin slabs can charge the storage battery. The monocrystal silicon thin slabs 50 achieves recycling of light energy, so that the rate of loss of the storage battery is greatly reduced, and the battery life of the storage battery is prolonged. Specifically, the plurality of monocrystal silicon thin slabs 50 are welded and connected in series between the two plate bodies of the first conducting plate 30 through nickel straps 90.

Meanwhile, according to the clearances formed between the matrix-distributed monocrystal silicon thin slabs 50, the LEDs 60 are distributed around outer sides of the monocrystal silicon thin slabs 50. "Main rods" of the two plate bodies of the second conducting plate 40 are also adaptively divided into a plurality of "thin forks" which interpenetrate in the clearances formed between the monocrystal silicon thin slabs 50 and serve as power supplies for the LEDs 60. In this way, the light emitting effect of the lamp can be improved by arranging LEDs 60 as many as possible. In order to better drive more LEDs 60, the plurality of tinned strips 41 are distributed on the second conducting plate 40 in the same direction at intervals. The tinned strips 41 on the "main rods" are used to improve a current carrying capacity of the second conducting plate 40 to provide stable current inputting for the LEDs 60.

The above embodiments are only used to describe the technical solutions of the present disclosure, and not intended to limit the present disclosure. Although the present disclosure has been described in detail with reference to the foregoing embodiments, those ordinarily skilled in the art should understand that they can still modify the technical solutions described in all the foregoing embodiments, or equivalently replace some of the technical features, and these modifications or replacements do not depart the essences of the corresponding technical solutions from the protection scope of the technical solutions of all the embodiments of the present disclosure.

What is claimed is:

1. An integrated solar street lamp, including an integrated light emitting panel and a transparent cover body, wherein the integrated light emitting panel is hermetically arranged in the transparent cover body; the integrated light emitting panel comprises:
   a first conducting plate, comprising two separated plate bodies;
   a second conducting plate, comprising two separated plate bodies;
   a plurality of monocrystal silicon thin slabs, coplanar with the first conducting plate, wherein the plurality of monocrystal silicon thin slabs are connected in series through conductors; two ends of the conductors are electrically connected to the two plate bodies of the first conducting plate respectively; and
   a plurality of light emitting diodes (LEDs), distributed in clearances between the monocrystal silicon thin slabs, wherein electric pins of the LEDs are electrically connected to the two plate bodies of the second conducting plate respectively.

2. The integrated solar street lamp according to claim 1, wherein the transparent cover body comprises an upper board body and a lower board body distributed in parallel; the integrated light emitting panel is arranged between inner sides of the upper board body and the lower board body; and outer rings of the inner sides of the upper board body and the lower board body are filled with sealants.

3. The integrated solar street lamp according to claim 2, wherein both the first conducting plate and the second conducting plate are copper foil plates, and a plurality of through holes are formed in positions of the conducting plates close to end portions; and the sealants fill the through holes.

4. The integrated solar street lamp according to claim 3, wherein the upper board body and the lower board body use high-transmittance tempered glass.

5. The integrated solar street lamp according to claim 1, wherein there are two layers of monocrystal silicon thin slabs symmetrically distributed; each layer of monocrystal silicon thin slabs are in matrix distribution; and the plurality of monocrystal silicon thin slabs are connected in series between the two plate bodies of the first conducting plate through nickel straps.

6. The integrated solar street lamp according to claim 5, wherein the LEDs are distributed around outer sides of the monocrystal silicon thin slabs by using the clearances formed between the monocrystal silicon thin slabs.

7. The integrated solar street lamp according to claim 1, wherein a plurality of tinned strips are distributed on the second conducting plate in a same direction at intervals.

* * * * *